UNITED STATES PATENT OFFICE.

CHARLES ROLLIN, OF NEWCASTLE-UPON-TYNE, ENGLAND, ASSIGNOR TO HIMSELF AND HEDWORTH BARIUM COMPANY LIMITED, OF NEWCASTLE-UPON-TYNE, ENGLAND.

PROCESS OF MAKING ANHYDROUS BARIUM HYDROXID.

974,993.     Specification of Letters Patent.     Patented Nov. 8, 1910.

No Drawing. Original application filed June 3, 1909, Serial No. 499,922. Divided and this application filed February 23, 1910. Serial No. 545,387.

*To all whom it may concern:*

Be it known that I, CHARLES ROLLIN, B. Sc., F. G. S., a subject of the King of Great Britain and Ireland, residing at Newcastle-upon-Tyne, England, have invented Improvements in or Relating to the Manufacture of Anhydrous Barium Hydroxid, of which the following is a specification.

In the manufacture of barium peroxid from barium hydroxid in the manner, for instance, forming the subject matter of another application for United States Patent Serial No. 499,922 filed by me, the present being a division thereof, it is essential that the barium oxid, formed as an intermediate product, shall not only be practically pure, but that it shall be in a porous condition, so as to expose sufficient surface to the oxidizing influence used for its complete conversion into the peroxid.

If it be attempted to drive off the water of crystallization from commercially pure crystallized barium hydroxid by heat, under ordinary atmospheric pressure, it is necessary, in order to complete the action on the large scale, to employ a high temperature with the result that the hydroxid, while fused in its own water of crystallization, exerts so strong a solvent action on the materials with which it comes in contact that, by the time the water of crystallization is driven off, not only is the anhydrous hydroxid very dense, but it contains impurities which detract from the value of the peroxid made from it.

No method has however been ever suggested by which an anhydrous amorphous barium hydroxid could be produced on the large scale. To mention only one of the difficulties of effecting practically complete elimination of the water, there is the tendency for the outside of the material under treatment to be more or less freed from water long before the inside can be acted upon and the hard outer layer thereby produced acts to prevent the complete removal of the water from the inner portion. This disadvantage can only be avoided by taking special precautions such as herein set forth.

Now the present invention has for object to produce in a simple and advantageous manner and on an industrial scale, practically pure anhydrous and amorphous barium hydroxid of uniform quality and in a sufficiently porous condition to admit of its ready conversion into barium oxid. For this purpose, commercially pure crystalline barium hydroxid is heated at a comparatively low temperature in a partial vacuum in such manner that sudden rise in temperature of any part thereof is avoided and the heat gradually transmitted throughout the mass and raised to the necessary degree. As an example, if pure crystallized barium hydroxid, containing eight molecules of water of crystallization, be very slowly and uniformly heated in a partial vacuum in which the pressure does not much exceed that corresponding to one inch of mercury, corresponding say to about 29″ (twenty nine inches) of vacuum, practically the whole of the water of crystallization can be driven off at a temperature below 200° C. (two hundred degrees centigrade) and a soft white porous mass of amorphous barium hydroxid obtained in which only a very small proportion of the original water of crystallization will remain, and which, from its physical condition, is well adapted for conversion into barium oxid. Even when crystallized barium hydroxid is heated in a partial vacuum corresponding to about eighteen to twenty inches of vacuum at a temperature of from about 160° to 200° C. (one hundred and sixty to two hundred degrees centigrade), a soft white porous mass of amorphous barium hydroxid has been obtained containing only about .25% to .5% (decimal two five to decimal five per cent.) of its weight of the original water of crystallization.

In another example the process can be conducted as last above described but with a temperature range of from 100° to 200° C. (one hundred to two hundred degrees centigrade).

The heating under vacuum may conveniently be carried out in a vessel formed of steel heated externally, as by a fire, flue gases, or superheated steam, the vessel having a flat or extended bottom over which the crystalline barium hydroxid to be treated is spread in a comparatively thin layer, having a depth of say for example, about two to three inches.

With a layer of barium hydroxid of this thickness and the degree of heat and vacuum last above mentioned, satisfactory results have been obtained by continuing the heating for about two days. The duration of the operation may however vary according to various circumstances, such as the thickness of the layer of barium hydroxid used, the degree of heat employed, and the degree of vacuum maintained, provided adequate precautions, as hereinabove indicated, are taken to avoid sudden temperature changes or irregularity of treatment.

What I claim is:—

1. A process for producing anhydrous barium hydroxid in an amorphous condition from crystallized barium hydroxid, said process consisting in slowly and uniformly heating the crystallized barium hydroxid in comparatively thin layers in a partial vacuum.

2. A process for producing anhydrous amorphous barium hydroxid from crystallized barium hydroxid, said process consisting in slowly and uniformly heating the crystallized barium hydroxid in comparatively thin layers in a partial vacuum at a comparatively low temperature.

3. A process for producing anhydrous amorphous barium hydroxid from crystallized barium hydroxid, said process consisting in slowly and uniformly heating the crystallized barium hydroxid in comparatively thin layers in a partial vacuum at a temperature below two hundred degrees centigrade.

4. A process for producing anhydrous amorphous barium hydroxid from crystallized barium hydroxid, said process consisting in slowly and uniformly heating the crystallized barium hydroxid in comparatively thin layers in a partial vacuum corresponding to from eighteen to twenty inches of vacuum at a temperature less than two hundred degrees centigrade but not less than one hundred degrees centigrade.

Signed at Newcastle-upon-Tyne, England, this ninth day of February 1910.

CHARLES ROLLIN.

Witnesses:
ALEXR. WARDLAW,
H. NIXON.